US006204466B1

(12) United States Patent
Tabor

(10) Patent No.: US 6,204,466 B1
(45) Date of Patent: Mar. 20, 2001

(54) EDM ELECTRODE FOR CREATING A GEAR TOOTH FORM HAVING A TOOTH SHAPE IN A CAVITY COMPONENT AND METHOD OF MAKING AN EDM ELECTRODE

(75) Inventor: David G. Tabor, Randolph, VT (US)

(73) Assignee: G.W. Plastics, Inc., Royalton, VT (US)

( * ) Notice: Subject to any disclaimer, the term of this patent is extended or adjusted under 35 U.S.C. 154(b) by 0 days.

(21) Appl. No.: 08/936,943

(22) Filed: Sep. 23, 1997

(51) Int. Cl.[7] ............................... B23H 9/00; B23H 9/12
(52) U.S. Cl. ........................................................ 219/69.17
(58) Field of Search ............................. 219/69.17, 69.2

(56) References Cited

U.S. PATENT DOCUMENTS

| 3,768,344 | * | 10/1973 | Feldcamp | 219/69.17 |
|---|---|---|---|---|
| 4,005,635 | * | 2/1977 | Feldcamp | 409/132 |
| 4,123,645 | | 10/1978 | Shichida et al. | 219/69.12 |
| 4,335,436 | | 6/1982 | Inoue | 219/69.16 |
| 4,626,645 | | 12/1986 | Inoue et al. | 219/69.12 |
| 4,841,126 | | 6/1989 | Graeber | 219/69.2 |
| 4,981,402 | | 1/1991 | Krenzer et al. | 409/26 |
| 5,539,172 | | 7/1996 | Takase et al. | 219/69.2 |
| 5,545,871 | | 8/1996 | Carr | 219/69.17 |
| 5,844,191 | * | 12/1998 | Cox | 219/69.17 |

FOREIGN PATENT DOCUMENTS

| 3-3726 | * | 1/1991 | (JP) . |
| 7-60554 | * | 3/1995 | (JP) . |

* cited by examiner

Primary Examiner—Geoffrey S. Evans
(74) Attorney, Agent, or Firm—Harter, Secrest & Emery LLP; Brian B. Shaw, Esq.; Stephen B. Salai, Esq.

(57) ABSTRACT

A method of forming a working electrical discharge machining electrode for creating an injection mold having a gear form. A cutter tool having a single cutting surface is formed, and the cutter tool is used to machine the electrode to form a tooth surface having the same curvature as the single cutting surface. In machining the electrode, a longitudinal axis of the cutter tool is substantially perpendicular to a longitudinal axis of an EDM electrode blank.

8 Claims, 4 Drawing Sheets

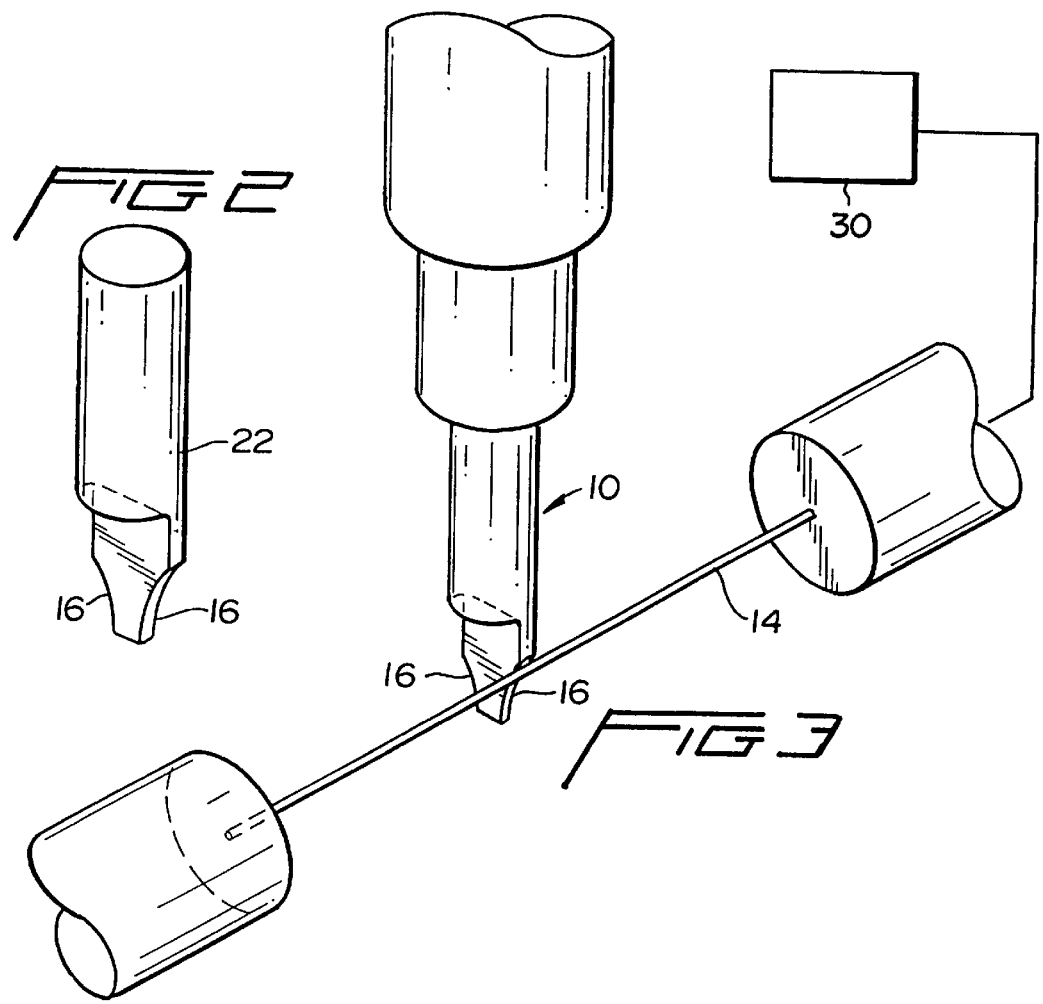
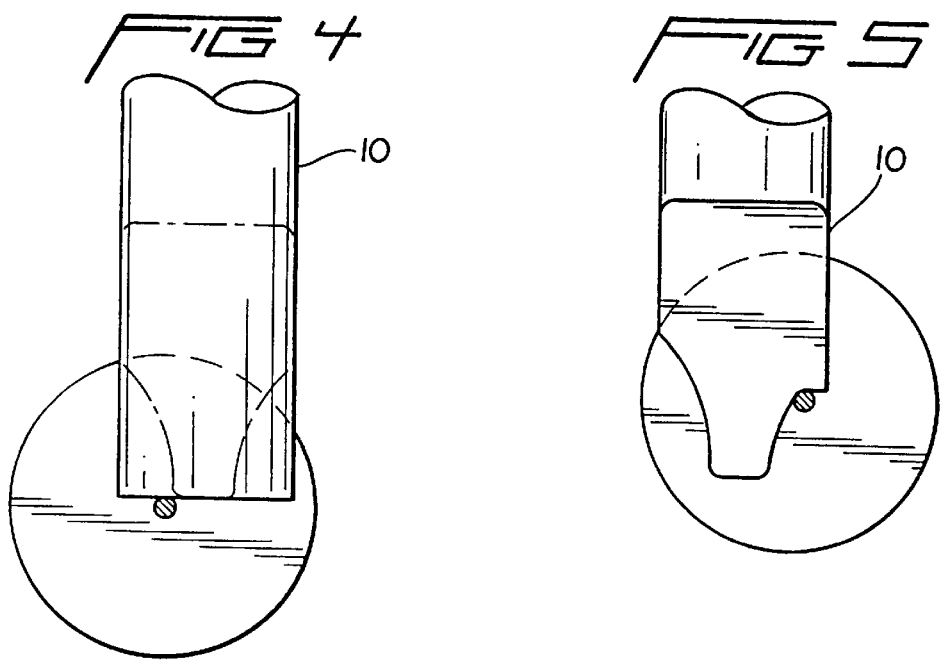

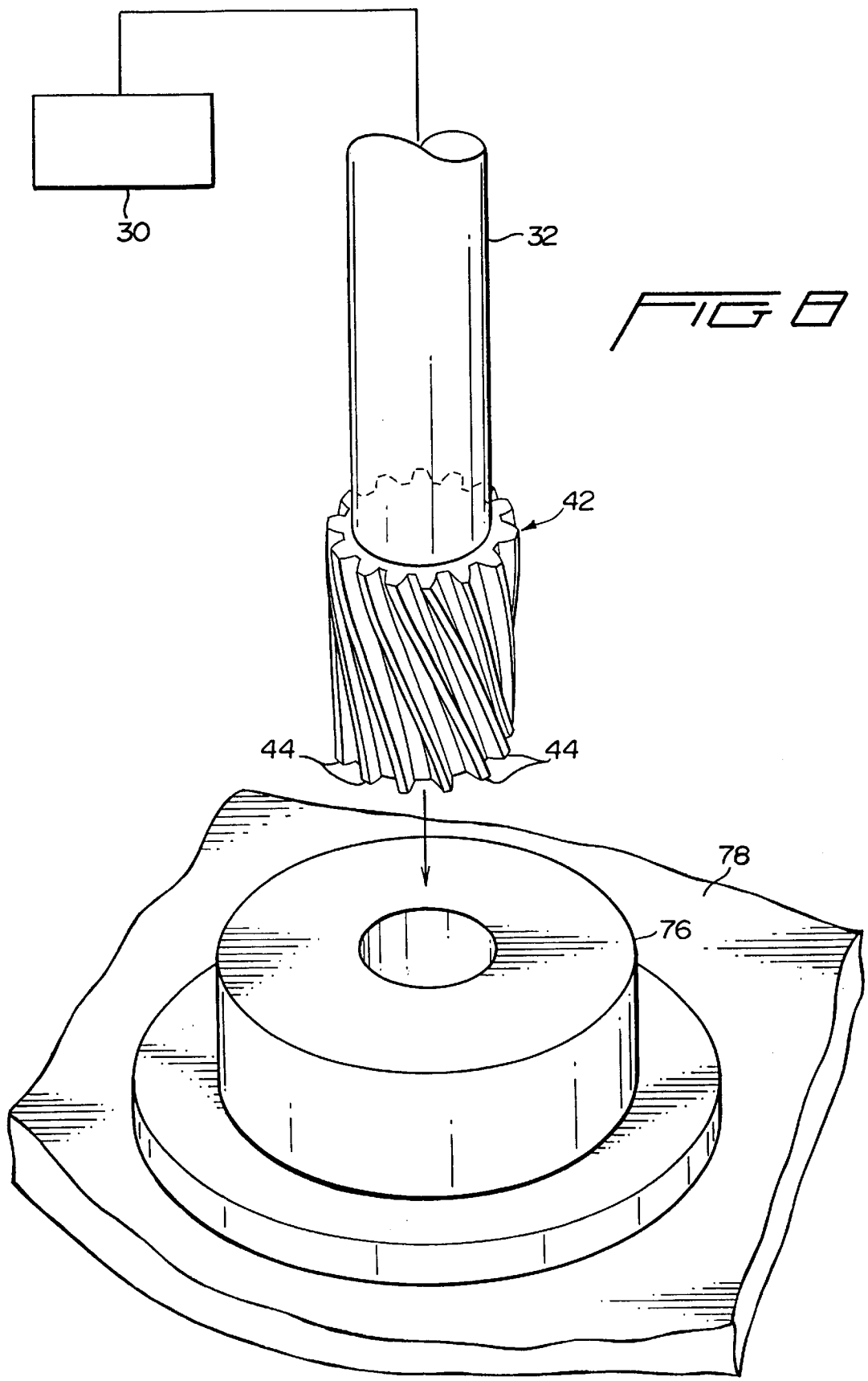

EDM ELECTRODE FOR CREATING A GEAR TOOTH FORM HAVING A TOOTH SHAPE IN A CAVITY COMPONENT AND METHOD OF MAKING AN EDM ELECTRODE

FIELD OF THE INVENTION

The present invention relates to the manufacture of injection molds for gears, and more particularly, to a method and apparatus for forming such gear molds by electrical discharge machining, wherein the electrical discharge machining is used to form a cutter from a blank, and the cutter has a single cutting surface. The single cutting surface of the cutter is then used to machine a gear form in an electrical discharge machining electrode. The electrical discharge machining electrode is then used to form the gear shape in a cavity, thereby creating the injection mold.

BACKGROUND OF THE INVENTION

Electrical discharge machining (EDM) is a popular electrode machining process. Electrodes for EDM are usually machined from a conductive material such as copper or graphite. Since the shape of the electrode, or at least the working portion of the electrode must correspond to the geometry of the desired, finished part, the electrode manufacturing process can be time-consuming depending upon the required complexity of the part shape. That is, the formation of the EDM electrode increases the cost and turnaround time for creating complex parts such as gear molds. Such complexity is particularly troublesome in the area of involute gear formation.

Further, during electrical discharge machining, the electrodes are subject to wear. Therefore, electrode life and cost are significant factors in the EDM process.

Even with the advent of computer generated design, measuring and feedback techniques to assist in effecting electrode design, the electrode machining still requires time, skill and considerable care. Advanced electrode systems often require several iterations.

Electric discharge machining removes material at a slow rate to provide the accuracy required in producing high precision parts. Mechanical cutters produce large chips, debris, and sharp edges on the structural member being cut and apply high loads of torque to the structural member during the cutting process. In contrast, EDM produces very small round chips, smooth edges and applies no torque to the structural member being cut.

In the EDM process, an electrode is brought in close proximity to an electrically conducting work piece creating a gap between the work piece and the electrode. The gap is gently flushed with a dielectric fluid as a pulse DC voltage is applied across the gap. The dielectric fluid is ionized at a localized spot as a large current flows across the gap, vaporizing a portion of the work piece. Thus, to make an EDM electrode for creating a mold having a particular gear form, (i.e. tooth shape and orientation), the electrode must include and fully define the gear form.

Heretofore, the gear forming electrode for an EDM process has been cut by generation. In general, in a gear generating machine, the generating tool can be considered as one of the gears in a conjugate pair with the EDEM electrode as the other gear. This generation is generally referred to as a "hobbing process". A hob is used to physically cut the involute surface on the gear teeth in the EDM electrode. However, hobbing is a time-consuming and expensive process. As industrial requirements force the total time from design to production to decrease, a significant need exists for the rapid generation of finished electrodes and molds.

In particular, this problem is evident in the injection molding of plastic gears. In such injection molding processes, the plastic is injected into a mold cavity, at least partially set and removed from the cavity, at which time the cavity is refilled.

Thus, for the formation of injection molded involute plastic gears, a blank EDM electrode is formed. The EDM electrode blank is then subjected to a hobbing process to form the involute curves of the desired gear in the EDM electrode. The EDM electrode is then used to form a corresponding involute gear form cavity in the mold blank.

Therefore, the need exists for a method of manufacturing an injection mold for the creation of plastic gears without requiring the expensive and time consuming hobbing process for forming an EDM electrode having an involute curve. The need also exists for forming EDM electrodes having involute surfaces without requiring the hobbing process.

SUMMARY OF THE INVENTION

In one embodiment, the present invention relates to a method of shaping an EDM electrode for creating a gear form in a cavity component, wherein the EDM electrode is machined with a cutting surface having the desired gear form. In a further embodiment, the preferred cutting surface is a single involute surface.

In a further embodiment, the step of machining the electrode includes machining with a cutter rotating about a cutter axis and machining the electrode with the cutter axis perpendicular to a longitudinal axis of the electrode.

In another embodiment, the present invention relates to an electrical discharge machining process for creating a gear tooth form in a cavity component with an EDM electrode having a gear form, wherein the EDM electrode is formed by milling the gear form into the electrode.

In a still further embodiment, the present invention relates to a method of forming an electrode for creating a gear cavity in a cavity component with an electrical discharge process, including forming a gear form cutting surface on a cutter and milling an electrode with the cutter to substantially reproduce the gear form in the electrode.

BRIEF DESCRIPTION OF THE DRAWINGS

FIG. 2 is a perspective view of the tool.

FIG. 3 is a perspective view of a wire EDM shaping a curve onto a tool blank.

FIG. 4 is a right side view of a tool blank shaped by the wire EDM.

FIG. 5 is a left side view of the tool blank being shaped by a wire EDM.

FIG. 8 is a perspective view of the electrode connected to an EDM and positioned to cut a gear form cavity in a mold blank.

DETAILED DESCRIPTION OF THE PREFERRED EMBODIMENTS

Figure 1:
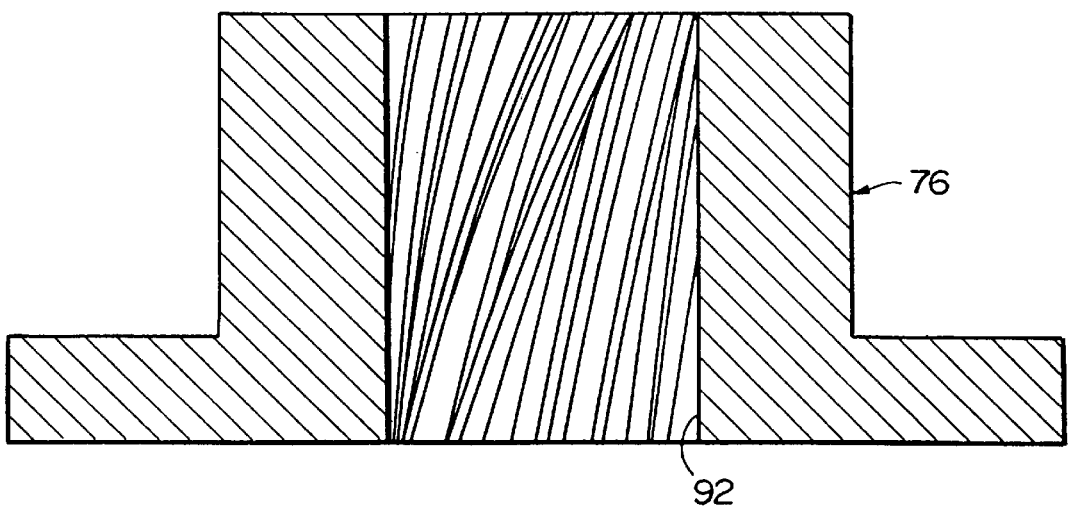
FIG. 1 is a cross-sectional view of the completed gear form.

Referring to FIG. 1, the present invention is directed to the creation of a gear form 92 in a cavity component 76, wherein the surfaces of the gear form are replicated in a gear formed by injection molding in the cavity component. Preferably, the gear form 92 includes involute gear tooth surfaces. Generally, the gear form 92 is created as a cavity in the cavity component 76 by means of an electrode using electrical discharge machining (EDM).

As used herein, the term "tooth form" is taken as the shape of the outer surface of the gear form 92. Although the tooth form generally is involute, it is understood that the outer surface of the gear form is a non-rack surface. Referring to FIGS. 1 and 2, a cutter tool 22 is defined by a single cutting surface 16 having a non-rack surface. Alternatively, the single cutting surface 16 of the cutter tool 22 for forming the working EDM electrode 42 may be described as having the tooth form. A gear thus formed includes a plurality of gear teeth defined by the single cutting surface 16, such that the single cutting surface of the cutter tool 22 is substantially reproduced in both the working EDM electrode 42 and the gear form 92 in the cavity component 76.

As shown in FIGS. 2–5, a cutter blank 10 is formed by EDM to create the cutter tool 22 having the single cutting surface 16. The cutter tool 22 is then used to machine or mill, rather than hob, an EDM electrode blank 40 so as to form a working EDM electrode 42 (See FIG. 6). The single cutting surface 16 of the cutter tool 22 is to be substantially reproduced in the working EDM electrode 42. Thus, in the present invention, the formation of the working EDM electrode 42 is done without requiring a hobbing process.

In particular, as shown in FIGS. 2–5, the cutter blank 10 is subjected to an EDM process to create the cutter tool 22. The cutter blank 10 is preferably mounted to a work table of a wire EDM machine using precision fixturing (not shown). The EDM electrode wire 14 passes through upper and lower wire guides. Relative motion between the electrode wire 14 and the cutter blank 10 imparts the desired cutting surface 16 to create the cutter tool 22. The cutting surface 16 has a non rack surface or gear shape. That is, the cutting surface 16 defines the tooth surface such that reproduction of the cutting surface 16 in the EDM electrode 42 does not require hobbing. However, it is understood the cutter tool 22 may be formed by a variety of different techniques to impart the single cutting surface 16. As the cutter tool 22 rotates about its longitudinal axis, the single cutting surface 16 may be symmetrically duplicated about the longitudinal axis of the cutter. That is, the single cutting surface 16 is a given curvilinear surface, and the given curvilinear surface may be employed twice for each revolution of the cutter by locating the cutting surface symmetrically about the longitudinal axis.

Figure 6:
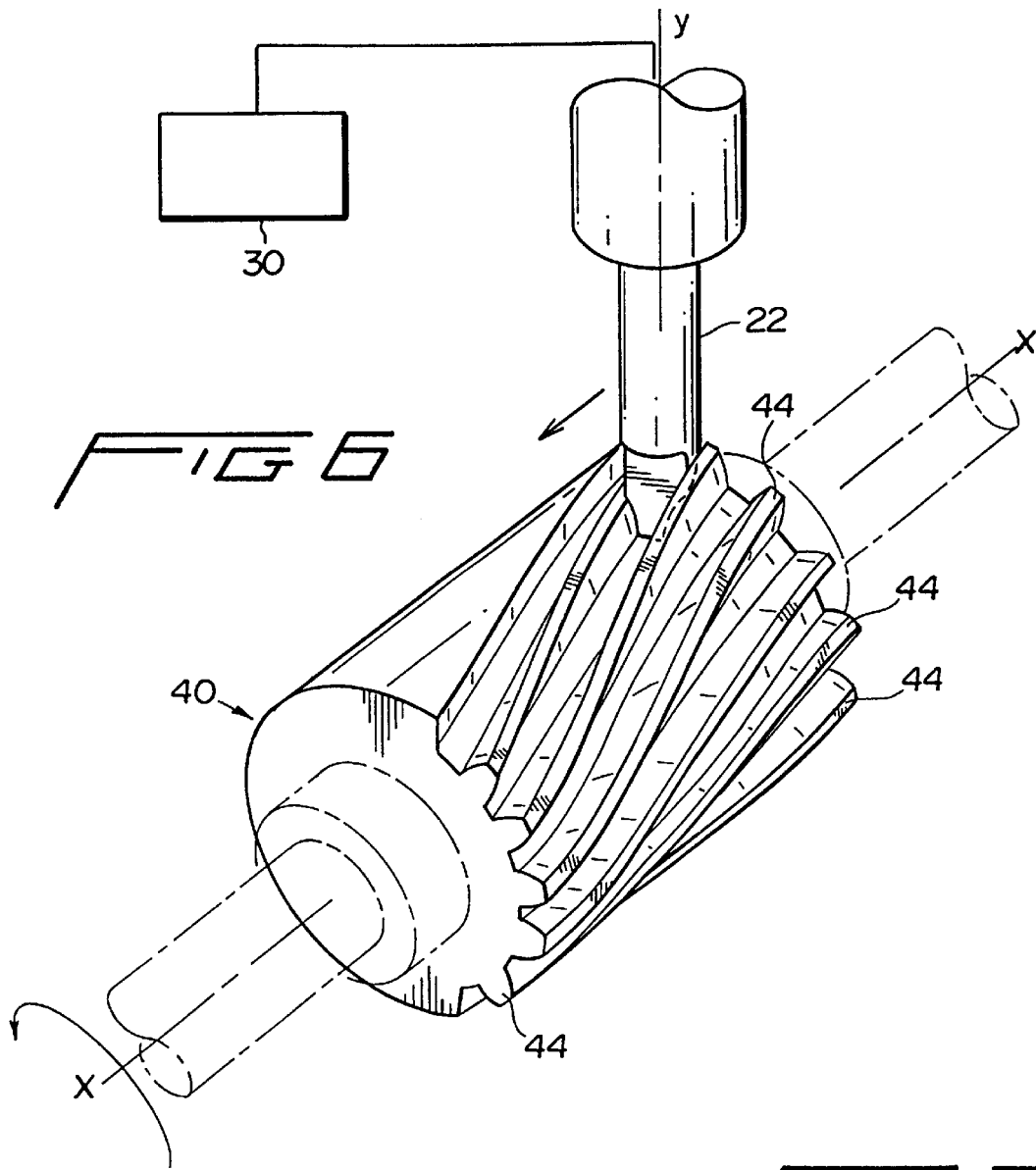
FIG. 6 is a perspective view of an electrode blank being cut by the tool.
Figure 7:
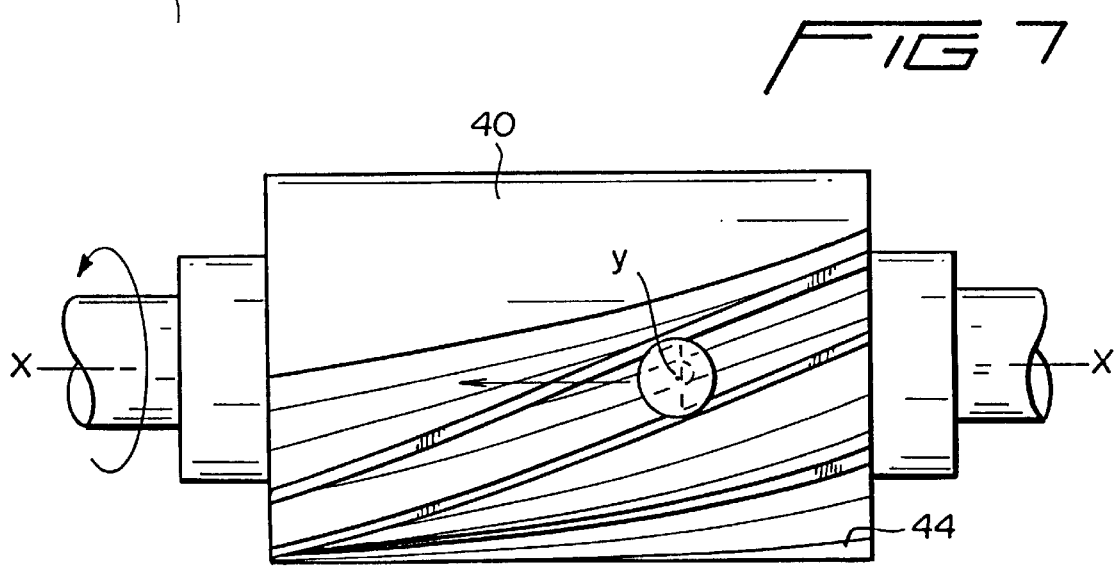
FIG. 7 is a top view of the tool cutting the electrode blank.

The EDM electrode blank 40 is to be machined or milled to form the working EDM electrode 42. As shown in FIGS. 6 and 7, the cutter tool 22 is located in the spindle 32 of a CNC milling machine 30. An EDM electrode blank 40 is fixed in a rotary attachment (not shown) to a CNC machine. This attachment is also computer controlled and can be coordinated with movement of the cutter tool 22. The cutter tool 22, having the single involute curve cutting surface 16, is then used to machine or mill the EDM electrode blank 40 to generate the working EDM electrode 42. The working EDM electrode 42 is subsequently employed to form the gear cavity 92 for injection molding plastic gears.

The EDM electrode blank 40 defines a longitudinal axis x about which it may rotate during creation of the working EDM electrode 42. The cutter tool 22 rotates about its own longitudinal axis y, wherein the cutter tool axis y and the electrode axis x are perpendicular.

The cutter tool 22 is then rotated about its longitudinal axis and simultaneously translated lengthwise along the axis x of the EDM electrode blank 40 to form the gear shape in the electrode. The cutting surface 16 of the cutter tool 22 is thus directly imparted and reproduced in the EDM electrode blank 40 in the form of involute teeth 44. The cutter tool 22 machines or mills the EDM electrode blank 40 to generate the working EDM electrode 42.

Generally, the gear teeth 44 on the working EDM electrode 42 are formed by cutting one space at a time in the electrode and then indexing to the next space. For example, if a straight spur gear is desired, then no rotation of the EDM electrode blank 40 is made during the cut. Alternatively, if the helical or worm gear is desired, the helical angle is calculated, (allowing for the effective spark gap, shrinkage, and other factors) with the rotation of the electrode blank 40 calculated and programmed into the path of the cutting tool 22 as the electrode rotates during the electrode cutting process.

In one preferred embodiment of the present invention, the single cutting surface 16 of the cutter tool 22 has the involute shape as the cutting edge of the cutter. Further, the center line of the cutter tool 22 (longitudinal axis y) is perpendicular to the center line of the EDM electrode blank 40 during milling of the electrode blank. The involute form is generated on the EDM electrode blank 40 as the spinning cutter tool 22 is perpendicular to the longitudinal axis of the electrode blank and is translated lengthwise in a direction substantially parallel to the longitudinal axis of the electrode.

Referring to FIG. 8, the working EDM electrode 42 is subsequently employed to form a cavity 92 for injection molding plastic gears. The working EDM electrode 42 having involute gear tooth surfaces 44 which are identical to the cutting surface 16 of the cutter tool 22 is shown in an EDM machine 80 for forming a corresponding gear form cavity or mold 92 in a cavity component 76.

Figure 9:
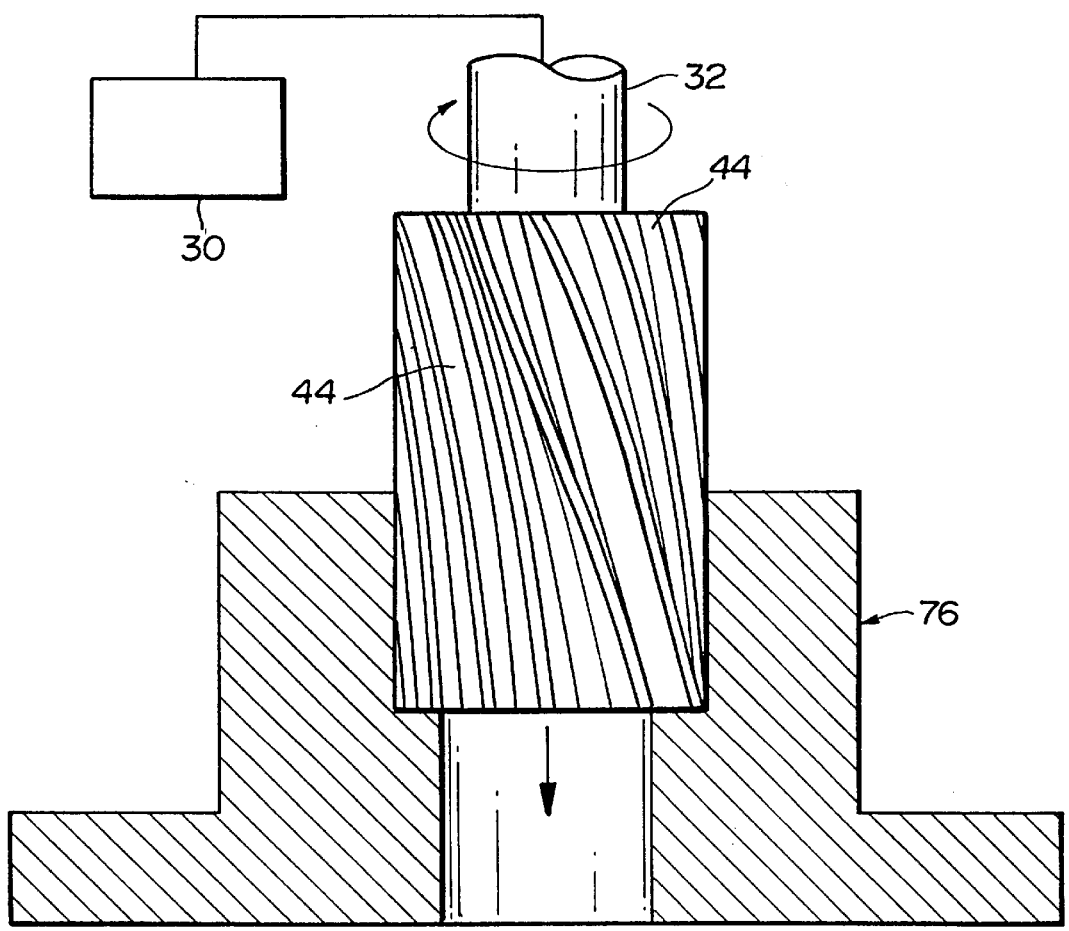
FIG. 9 is a cross-sectional view of the electrode making the gear form cavity in the mold blank.

FIG. 9 shows the finished gear form mold 92. After formation, the gear form cavity 92 is used in the injection molding process to produce a plastic gear.

Generally, the working EDM electrode 42 is mounted in a spindle 32 and the cavity component 76 is fixed on a support, such as, for example, a table 78. When forming a spur gear, motion of the working EDM electrode is vertical only. However, when making a helical gear cavity, the working EDM electrode 42 must be rotated a calculated amount as the working EDM electrode passes through the cavity component 76. Again, machine conditions are predetermined to account for the spark gap, mold material shrinkage, etc.

In one preferred embodiment, the cutter tool 22 may be formed by a variety of materials such as a carbide or high speed steel with carbide being particularly preferred. The EDM electrode blank 40 is preferably made from graphite or copper, with copper being most preferred. The milling machine may be any commercially available model, such as a Bostomatic machine. A preferred wire EDM machine for shaping the cutting tool is the Makino. Other commercially available machines may be used in accordance to the methods described to achieve acceptable finished gear results, as would be readily understood by one skilled in the gear manufacturing field.

Formation of the present working EDM electrode 42 by use of a single cutter tool 22 having a single cutting surface 16 allows different EDM electrodes to be formed by merely employing a cutter 22 with a different cutting surface 16.

That is, by changing cutters 22, a different thread configuration may be formed in the EDM electrode.

The working EDM electrode formed by the present method is produced in a reduced time as compared to the hobbing process. Further, the present working EDM electrode has substantially lower surface strain and fractures than an EDM electrode formed by hobbing. Witness lines are formed in the EDM electrode upon hobbing or machining. The witness lines are unique to each type of manufacture. That is, upon microscopic inspection, the machined surface exhibits witness lines that cannot be formed by the hobbing process. Similarly, the hobbed surface exhibits witness lines that cannot be formed by machining.

Further, in the hobbing process, the hobbing cutter may rotate at a rate of approximately 200 rpm, providing approximately 500 surface feet per minute of the hobbing cutter to the EDM electrode blank. In contrast, the milled EDM electrode is formed by the cutter 22 rotating at a rate of approximately 6000 rpm, where the EDM electrode is exposed to approximately 2,500 surface feet per minute of the single cutting surface of the cutter.

Although particular embodiments of the present invention has been disclosed herein for purposes of explanation, further modifications or variations thereof will be apparent to those skilled in the art to which this invention pertains.

What is claimed:

1. A method comprising:
   (a) machining an electrical discharge machining electrode blank with a cutter to form a working electrical discharge machining electrode, wherein a cutting surface of the cutter has a tooth shape of a gear form; and
   (b) forming an injection mold cavity having the gear form from the working electrical discharge machining electrode, and injection molding a gear in the cavity.

2. The method of claim 1, wherein the cutter has a single cutting surface.

3. The method of claim 1, wherein the cutter has a single, involute cutting surface.

4. The method of claim 1, wherein machining the electrical discharge machining electrode blank includes machining with the cutter rotating about a cutter axis perpendicular to a longitudinal axis of the electrical discharge machining electrode blank.

5. A method of forming a gear cavity in a cavity component, comprising:
   (a) electrical discharge machining a gear form cutting surface in a cutter;
   (b) milling an electrode with the cutting surface to create the gear form in the electrode; and
   (c) forming the gear cavity in the cavity component by electrical discharge machining with the electrode.

6. A method comprising:
   (a) forming a single gear form cutting surface in a cutter;
   (b) milling an electrical discharge process electrode with the cutter to create the gear form in the electrode; and
   (c) forming a gear shape in a cavity from the milled electrical discharge process electrode.

7. The method of claim 6, wherein the milled electrical discharge process electrode is employed in an electrical discharge machining process to form a gear cavity in an injection molding cavity component.

8. The method of claim 6, wherein forming the gear form shape includes forming an involute tooth surface.

\* \* \* \* \*